US009122465B2

(12) United States Patent
Schardt et al.

(10) Patent No.: US 9,122,465 B2
(45) Date of Patent: Sep. 1, 2015

(54) PROGRAMMABLE MICROCODE UNIT FOR MAPPING PLURAL INSTANCES OF AN INSTRUCTION IN PLURAL CONCURRENTLY EXECUTED INSTRUCTION STREAMS TO PLURAL MICROCODE SEQUENCES IN PLURAL MEMORY PARTITIONS

(75) Inventors: Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 13/311,809

(22) Filed: Dec. 6, 2011

(65) Prior Publication Data

US 2013/0145128 A1      Jun. 6, 2013

(51) Int. Cl.
*G06F 9/22* (2006.01)
*G06F 9/38* (2006.01)
*G06F 9/24* (2006.01)
*G06F 9/32* (2006.01)

(52) U.S. Cl.
CPC .. *G06F 9/22* (2013.01); *G06F 9/24* (2013.01); *G06F 9/328* (2013.01); *G06F 9/3851* (2013.01)

(58) Field of Classification Search
None
See application file for complete search history.

(56) References Cited

U.S. PATENT DOCUMENTS

| 4,376,976 | A | * | 3/1983 | Lahti et al. | 712/248 |
| 4,430,707 | A | * | 2/1984 | Kim | 718/100 |
| 5,235,686 | A | * | 8/1993 | Bosshart | 712/247 |
| 5,659,801 | A | * | 8/1997 | Kopsaftis | 710/62 |
| 5,796,972 | A | * | 8/1998 | Johnson et al. | 712/208 |
| 6,081,888 | A | * | 6/2000 | Bell et al. | 712/248 |
| 6,438,664 | B1 | * | 8/2002 | McGrath et al. | 711/154 |
| 6,654,875 | B1 | * | 11/2003 | Hartnett et al. | 712/211 |
| 7,640,418 | B2 | * | 12/2009 | Lee et al. | 712/205 |
| 2007/0088939 | A1 | * | 4/2007 | Baumberger et al. | 712/248 |

* cited by examiner

*Primary Examiner* — Kenneth Kim
(74) *Attorney, Agent, or Firm* — Scott Stinebruner

(57) ABSTRACT

A method and circuit arrangement utilize a programmable microcode unit that is capable of being programmed via software to modify the instruction sequences output by the microcode unit in response to microcode instructions issued to the microcode unit. Multiple instruction sequences may be stored in different partitions defined in one or more rewriteable memories such that different instruction sequences may be output for different instances of a microcode instruction executing in different, concurrently-executing instruction streams.

20 Claims, 7 Drawing Sheets

PROGRAMMABLE MICROCODE UNIT FOR MAPPING PLURAL INSTANCES OF AN INSTRUCTION IN PLURAL CONCURRENTLY EXECUTED INSTRUCTION STREAMS TO PLURAL MICROCODE SEQUENCES IN PLURAL MEMORY PARTITIONS

FIELD OF THE INVENTION

The invention is generally related to data processing, and in particular to processor architectures and microcode units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time.

In addition, it is also possible to employ multiple execution units in the same processor to provide additional parallelization. The multiple execution units may be specialized to handle different types of instructions, or may be similarly configured to process the same types of instructions.

Typically, a scheduling algorithm is utilized in connection with issue logic to ensure that each thread in a multi-threaded architecture is able to proceed at a reasonable rate, with the number of bubbles in the execution unit pipeline(s) kept at a minimum. In addition, when multiple execution units are used, the issuance of instructions to such execution units may be handled by the same issue unit, or alternatively by separate issue units.

Another technique that may be used to improve the performance of a processor is to employ a microcode unit or sequencer to automatically generate instructions for execution by an execution unit. A microcode unit or sequencer responds to commands, e.g., via dedicated instructions in an instruction set, and in response, outputs a sequence of instructions to be executed by the processor. In much the same way that a software procedure can be used to perform a repeatable sequence of steps in response to a procedure call in a software program, a microcode unit or sequencer can be triggered by a command or instruction to perform a repeatable operation.

Microcode units or sequencers are particularly useful for performing long latency operations, i.e., operations that take a relatively long time to perform, and in the case of pipelined execution units, often require multiple passes through an execution pipeline. Typically, a microcode unit or sequencer maps particular instructions in an instruction set architecture to a sequence of instructions so that, upon an issue unit receiving an instruction designated for the microcode unit (referred to herein as a microcode instruction), the issue unit will route the instruction to the microcode unit, which then temporarily stalls the issue unit and outputs the sequence of instructions to an execution unit.

The mapping of microcode instructions to sequences of instructions is typically maintained in a read only memory (ROM) or hard coded into the microcode unit. As a result, microcode units are typically custom designed for particular applications.

However, as computers and other programmable electronic devices continue to be integrated deeper and deeper into every aspect of society, and as programmable chips such as microprocessors, microcontrollers, Application Specific Integrated Circuits (ASIC's) and the like continue to increase in complexity and power while costs, the design, verification and testing of such programmable chips has become a significant contributor to the overall costs of such chips. For this reason, design reuse is employed whenever possible so that portions of a programmable chip, such as particular processing core designs, functional units, and other logic blocks, which have previously been designed, tested and verified, do not need to be recreated from scratch.

Nonetheless, increasing specialization of processor designs often limits the ability to reuse components in different designs. From the perspective of a microcode unit, for example, limits on the size of the unit often limits the number of microcode instructions that can be supported. Furthermore, instruction sets are often limited in size, so allocating a large number of the available instructions in an instruction set to a microcode unit limits the other types of instructions that can be supported. Consequently, conventional microcode units are typically relatively small and limited in scope, and optimized for handling a few specialized instruction sequences. Different processor designs intended for different applications, which might otherwise utilize very similar hardware circuitry, may nonetheless require different microcode units in order to support those different applications.

Another shortcoming of conventional microcode units is that since the units are designed to support a specific set of microcode instructions and instruction sequences, any faults in the designs are essentially fabricated as hard coded logic in the processor chips themselves, so there is typically no way to correct any such faults in any manufactured chips.

Therefore, a significant need continues to exist in the art for a manner of facilitating the development of application-specific programmable chips and electronic devices incorporating the same, particularly with regard to the microcode units therein.

SUMMARY OF THE INVENTION

The invention addresses these and other problems associated with the prior art by providing a method and circuit arrangement that utilize a programmable microcode unit that is capable of being programmed via software to modify the instruction sequences output by the microcode unit in response to microcode instructions issued to the microcode unit. Among other benefits, a programmable microcode unit consistent with the invention enables customization of a processor design to handle specific applications or tasks, as well as to support specific hardware configurations such as specific execution units. In addition, a programmable microcode unit consistent with the invention may be updatable, e.g., to correct bugs or faults found in previous instruction sequences supported by the unit.

Consistent with one aspect of the invention, a processing core includes an issue unit and at least one execution unit, where the issue unit is configured to issue instructions from an instruction stream to the at least one execution unit for execution thereby. In response to software executing on the processing core, a programmable microcode unit coupled to the issue unit is programmed to map an instruction sequence to a microcode instruction, and in response detecting the microcode instruction in the instruction stream, the instruction sequence is issued to the at least one execution unit with the programmable microcode unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a programmable microcode unit that is capable of being programmed via software to modify the instruction sequences output by the microcode unit in response to microcode instructions issued to the microcode unit. Among other benefits, a programmable microcode unit consistent with the invention enables customization of a processor design to handle specific applications or tasks, as well as to support specific hardware configurations such as specific execution units. In addition, a programmable microcode unit consistent with the invention may be updatable, e.g., to correct bugs or faults found in previous instruction sequences supported by the unit.

A microcode unit, which may alternatively be referred to herein as a sequencer, receives microcode instructions from an instruction stream and outputs instruction sequences in response thereto. An instruction stream includes a plurality of instructions representing a path of execution, typically associated with a common thread, process, application, or program. A microcode instruction is typically an instruction defined in an instruction set for a processor, which is either detected by a microcode unit or an instruction or issue unit, and which causes the microcode unit to output an instruction sequence to one or more execution units for execution thereby. An instruction sequence typically encompasses a plurality of instructions suitable for execution by one or more execution units, and it will be appreciated that an instruction sequence may implement loops or other software-like flows in some embodiments.

A microcode unit consistent with the invention is programmable to the extent that either the instruction sequences or mappings of instruction sequences to microcode instructions are not statically defined, and can be modified either during startup or during runtime of a processor in response to software executed by the processor. In the embodiments discussed hereinafter, for example, a microcode unit consistent with the invention may include a rewriteable memory within which instruction sequences are stored, and from which the microcode unit retrieves instruction sequences when executing microcode instructions. The microcode unit may be programmable, for example, via software, such that an application, operating system, kernel, firmware, or other software entity can effectuate the programming. However, it will be appreciated that a microcode unit may be programmed in other manners, and as such, the invention is not limited to the particular implementations disclosed herein.

Other variations and modifications will be apparent to one of ordinary skill in the art. Therefore, the invention is not limited to the specific implementations discussed herein.

Hardware and Software Environment

Figure 1:
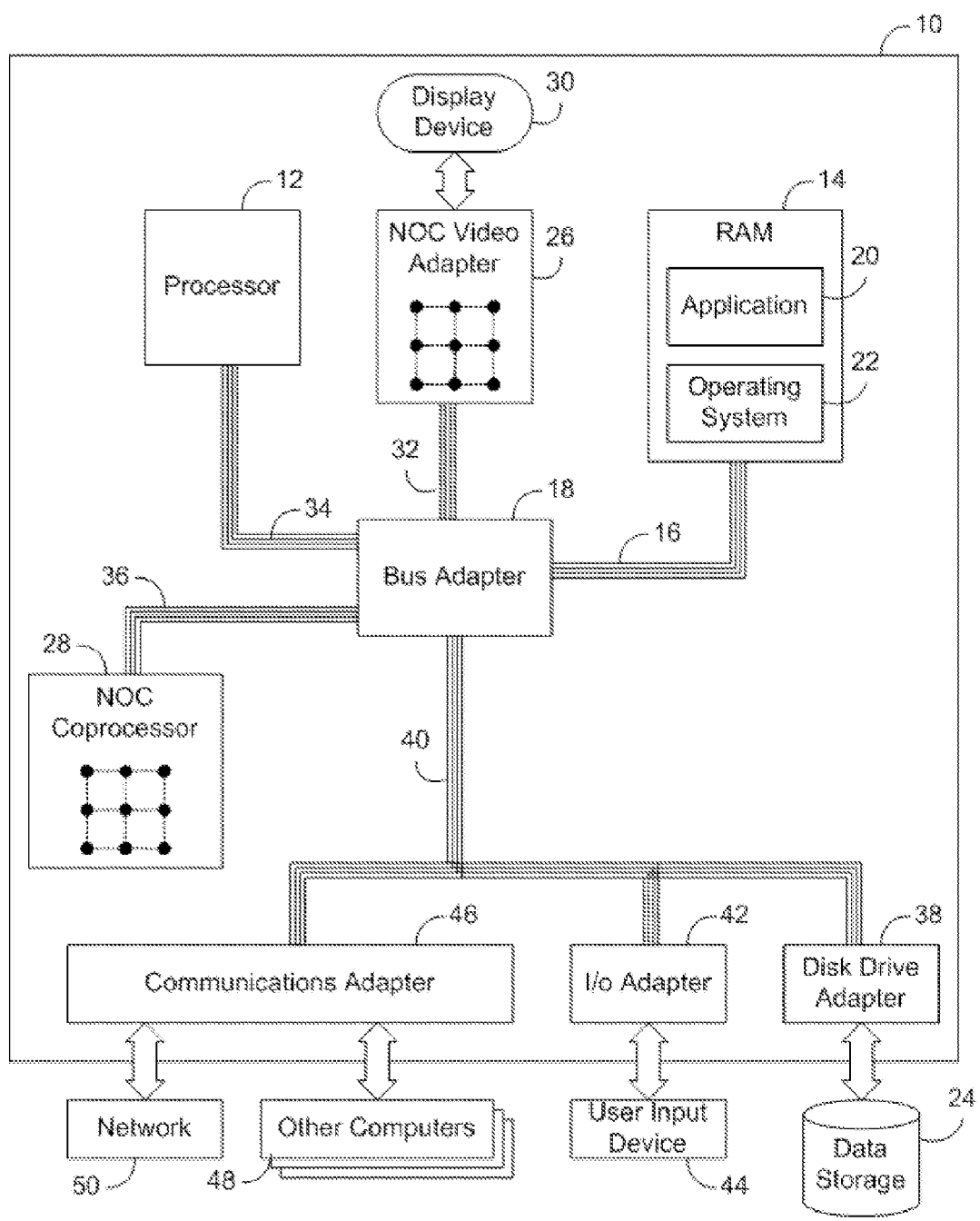
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
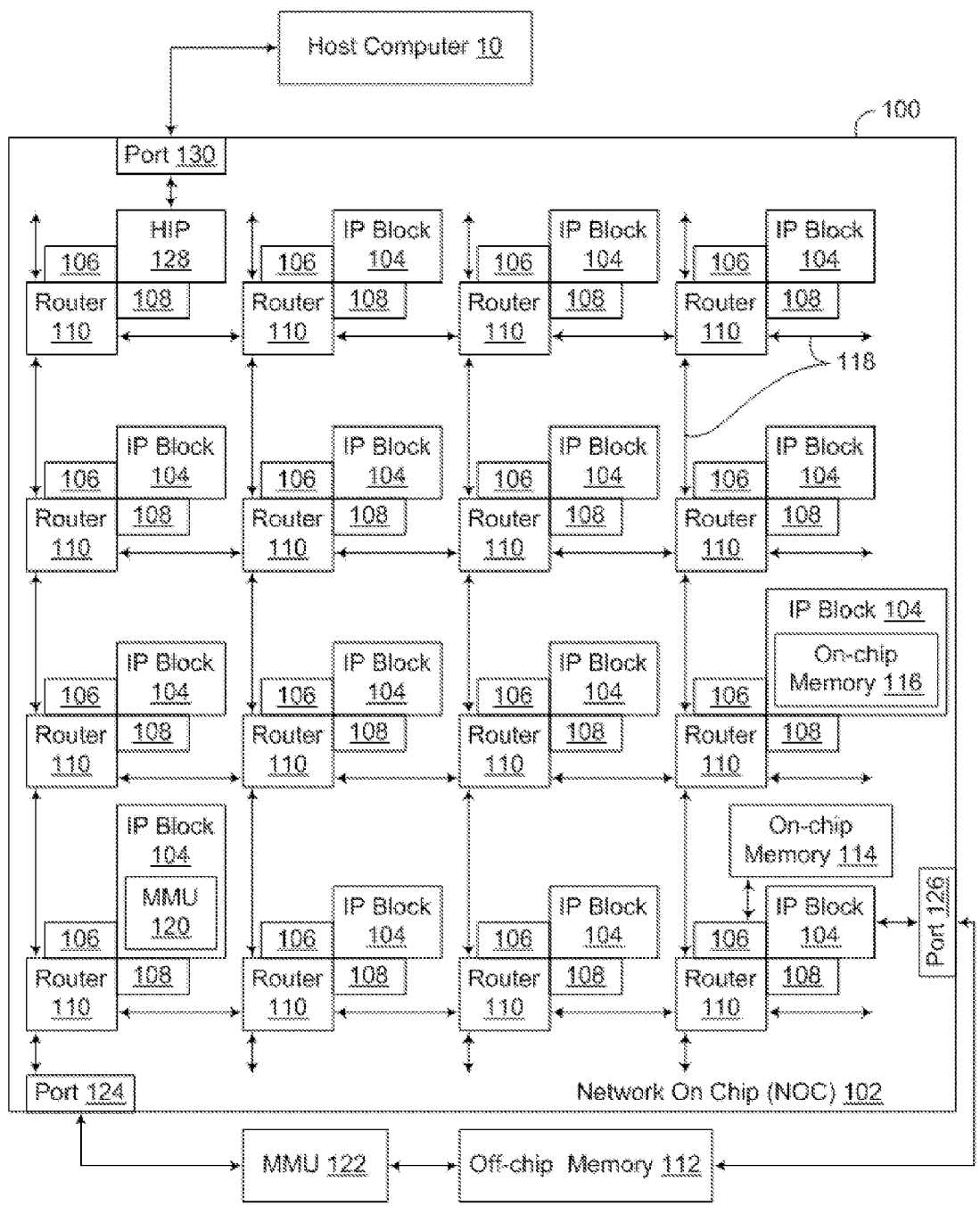
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
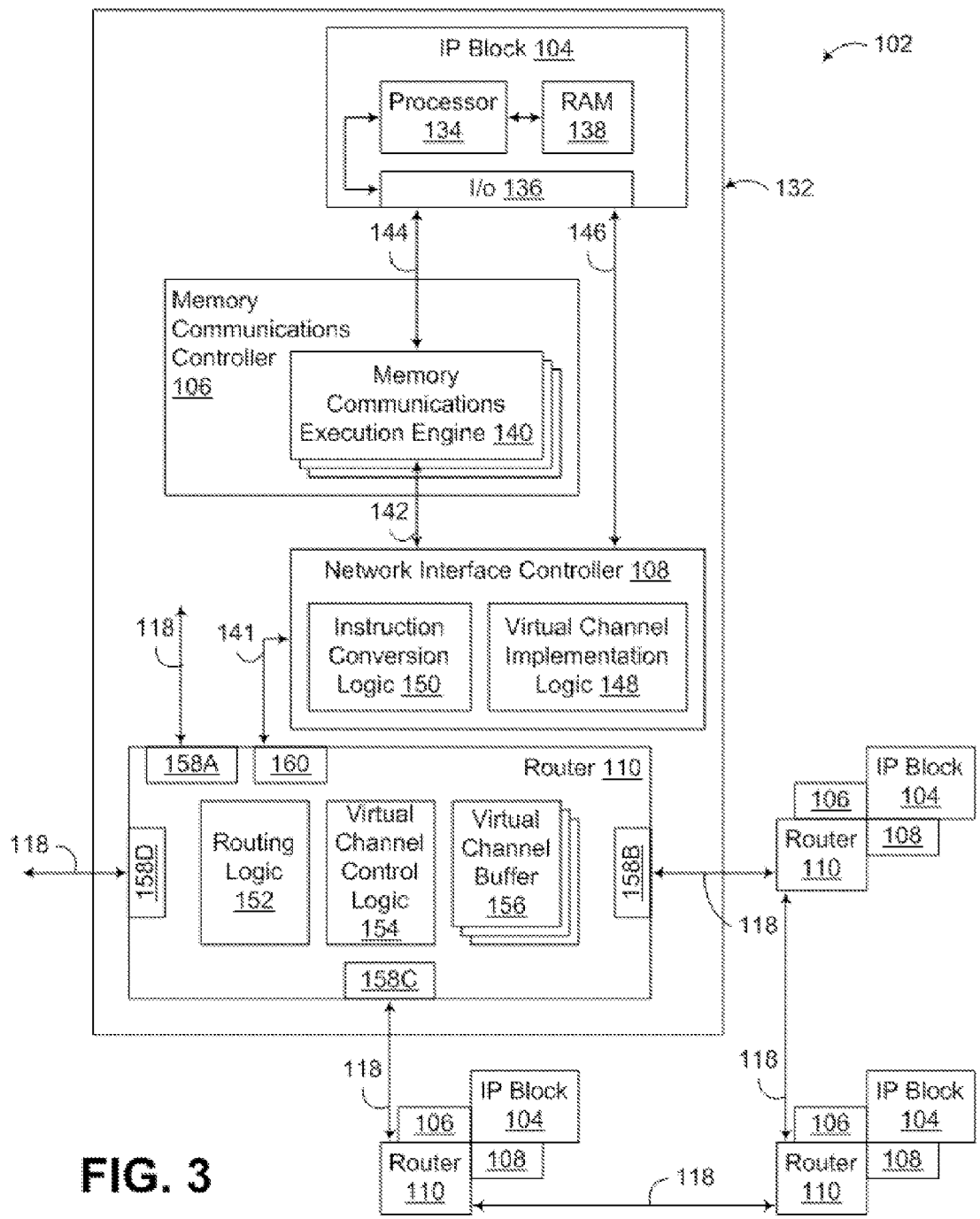
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
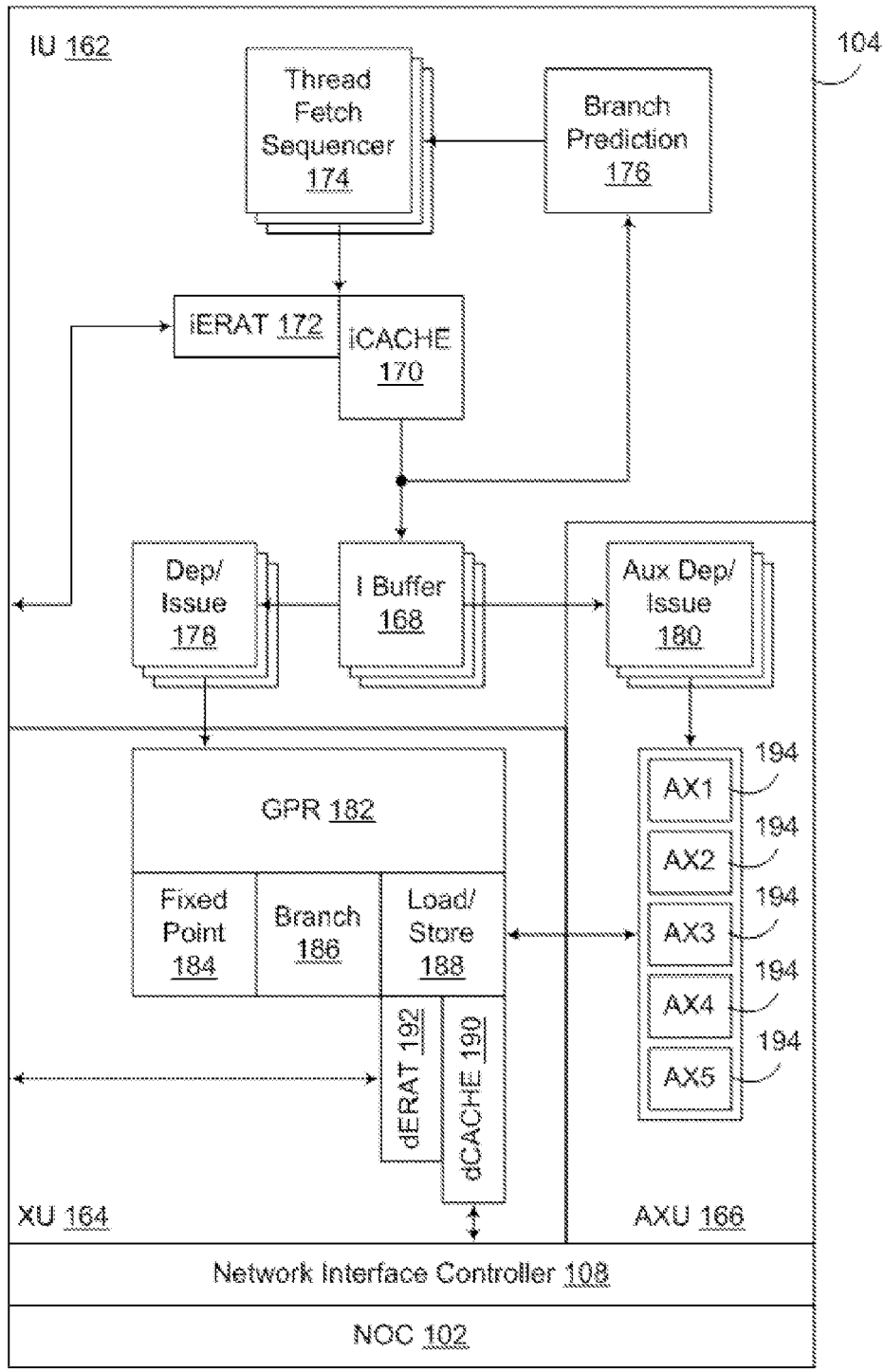
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Programmable Microcode Unit

Figure 5:
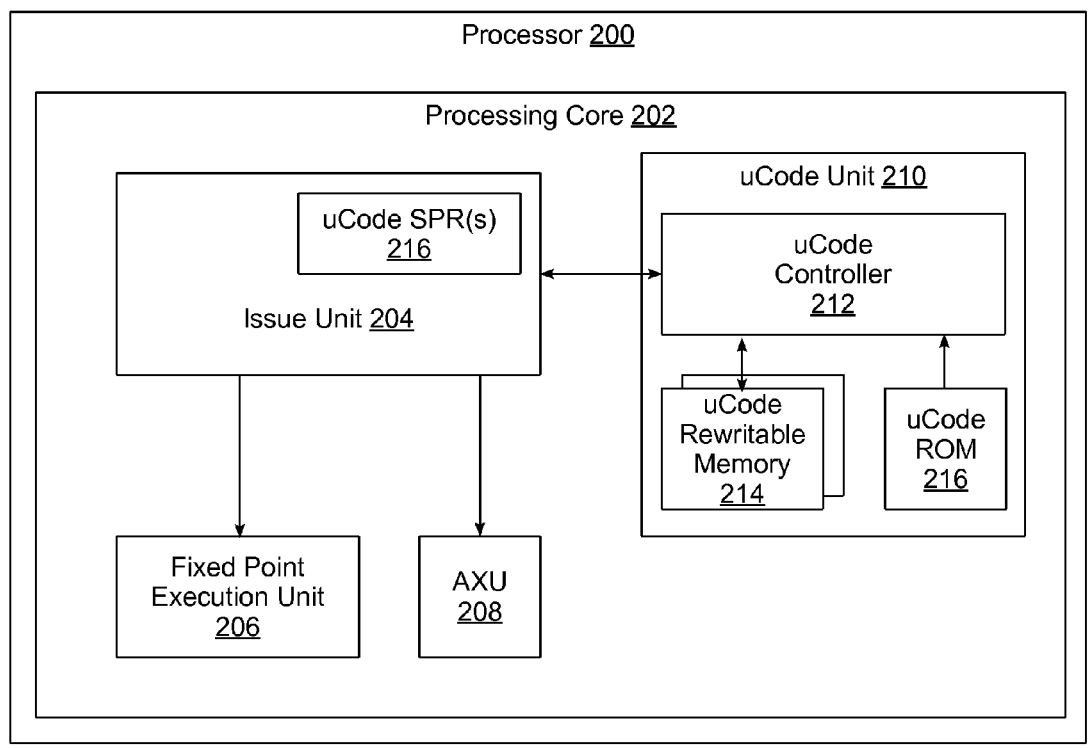
FIG. 5 is a block diagram of an exemplary data processing system incorporating a programmable microcode unit consistent with the invention.

Turning now to FIG. 5, a data processing system is illustrated incorporating a processor 200 including a processing core 202 with an instruction or issue unit 204, fixed point execution unit 206, auxiliary execution unit (AXU) 208 and programmable microcode unit 210. Processing core 202 may be implemented, for example, in a similar manner to IP block 104 of FIG. 4, although it will be appreciated that practically any single or multi-core processor design capable of utilizing a microcode unit may be used in the alternative.

Programmable microcode unit 210 includes a controller 212 and one or more microcode rewritable memories 214 within which is stored instruction sequences mapped to specific microcode instructions. A microcode rewritable memory 214 may be implemented with any rewritable memory technology, including DRAM, SRAM, Flash memory, etc. Memory 214 may be volatile or non-volatile, and is typically, but not necessarily, supports random access.

In many embodiments it is desirable to limit the size of memory 214, while in other embodiments it may be desirable to incorporate multiple memories 214, or to provide multiple partitions in a memory 214, e.g., so that microcode instructions may be mapped to multiple instruction sequences. By doing so, for example, a programmable microcode unit may be optimized for different applications, threads, or tasks such that the same microcode instruction, when issued on behalf of the different applications, tasks or threads can trigger the execution of different instruction sequences. In addition, in a multithreaded environment, a programmable microcode may concurrently execute different applications, tasks or threads with different instruction sequences mapped to the same microcode instructions.

Programmable microcode unit 210 may also include a microcode read only memory (ROM) 216 within which is stored a default or initial set of instruction sequences. These default instruction sequences may be loaded from ROM 216 into rewriteable memory 214 during power up or initialization. In the alternative, ROM 216 may be omitted. In some embodiments, for example, rewriteable memory 214 may be non-volatile, such that initialization of the rewriteable memory is not required at power up of the processor.

Programmable microcode unit 210 may be programmed in a number of manners consistent with the invention. For example, as illustrated in FIG. 5, one or more microcode special purpose registers (SPR's) 216 may be provided, e.g., within issue unit 204, with logic disposed in the issue unit to detect a store to a SPR 216 and forward the stored data to programmable microcode unit 210. In one embodiment, for example, separate address and data SPR's 216 may provide random access to rewriteable memory 214. In another embodiment, an address SPR 216 may be used to provide a starting address in the rewriteable memory 214, so that further stores to the data SPR 216 auto increment the current address to eliminate the need to provide an address for each write to the rewritable memory 214. In yet another embodiment, only a single SPR 216 may be provided, e.g., with an auto-increment of a current address performed in response to writes to the SPR. In still other embodiments, rewriteable memory 214 may be assigned a portion of a memory address space such that the rewriteable memory may be directly written to by software. Other manners of storing instruction sequences in rewriteable memory 214 may also be used consistent with the invention.

Figure 6:
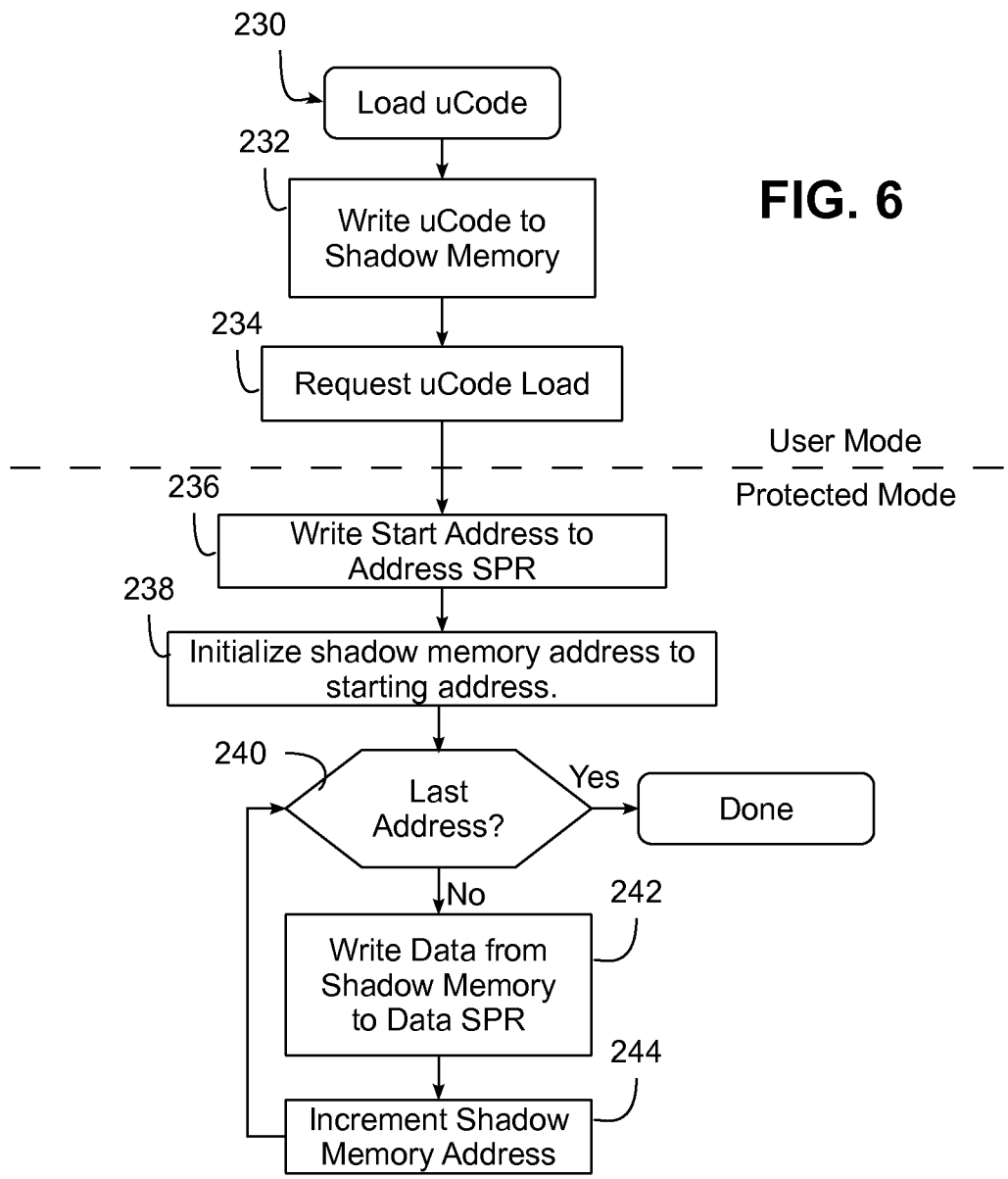
FIG. 6 is a flowchart illustrating an exemplary sequence of operations performed to program the programmable microcode unit referenced in FIG. 5.

FIG. 6, for example, illustrates an exemplary sequence of operations 230 that may be utilized to program microcode unit 210. In this implementation, it is presumed that an address SPR is used to provide a start address in the microcode unit rewriteable memory while a data SPR is used to provide write data to be stored in a current address in the rewriteable memory. Auto-increment is also supported such that a store or move to the data SPR increments the current address to the next location in the rewriteable memory, such that a sequence of a stores to the data SPR may be used to program the microcode unit.

It is also presumed that the address and data SPR's are restricted from access by user mode code, and as such a protected or supervisor mode is required to access the SPRs. Programming the microcode unit with user mode code in this implementation requires that the user mode code write the desired image of the rewriteable memory to a shadow memory, followed by a call to a protected or supervisor mode program such as an operating system, kernel or firmware to copy the contents of the shadow memory over to the rewriteable memory.

As such, in block 232 user mode code writes the microcode unit data to a shadow memory, e.g., a dedicated region of the memory address space, or to a region of the memory address space allocated to the user mode code. The microcode unit data is typically a shadow image of the rewriteable memory, and includes all of the instruction sequences to be mapped to the microcode instructions supported by the programmable microcode unit. The image may also include a data structure that maps the instruction sequences to the microcode instructions, e.g., using a table or other data structure that specifies each supported microcode instruction, a starting address of a corresponding instruction sequence, and a length or ending address of the corresponding instruction sequence.

Next, the user mode code requests a kernel or other protected mode code to load the shadow copy of the microcode unit data into the rewriteable memory. In one embodiment, for example, the user mode code may raise an exception to the kernel, such that the kernel, in processing the exception, can request and receive a reason for the exception that indicates that the user mode code is requesting to load the microcode unit with a new image. Other manners of requesting a microcode load may be used in other embodiments, e.g., via direct calls to the kernel through an API, or in other manners that would be appreciated by one of ordinary skill in the art having the benefit of the instant disclosure.

Next, in block 236, protected mode code, e.g., a kernel, operating system, hypervisor, etc., writes a start address to an address SPR, indicating a starting location in the microcode unit rewriteable memory. Block 238 then initializes a current address variable to point to the starting address in the shadow memory, and block 240 initiates a loop that is terminated when the current address variable indicates that the last address in the shadow memory has been written. In block 242, the protected mode code writes the data stored in the shadow memory at the current address to a data SPR for the microcode unit, which results in an auto-increment of the address pointer for the microcode unit rewriteable memory. Then, in block 244, the current address variable for the shadow memory is incremented, and control is returned to block 240.

Once the last address in the shadow memory image has been written, block 240 terminates the sequence of operations, and the update of the rewriteable memory is complete. In some implementations it may also be desirable to reset or restart the microcode unit upon completion of the update.

Other manners of programming the microcode unit may be used in the alternative. For example, an assumption may be made that all memory addresses in the rewriteable memory will be rewritten, so no starting address may need to be specified, and no separate address SPR may need to be provided. Alternatively, support for rewriting only a portion of the rewriteable memory may be provided. In other embodiments, separate address and data SPR's may be provided, requiring protected mode code to specify the address that each data value needs to be written to when programming the microcode unit. In another embodiment, a sequencer or other logic may be disposed in the processing core to handle the update of the microcode unit, so that, for example, protected mode code may provide a starting address of the shadow memory and/or a size to the microcode unit so that the rewriteable memory update is handled directly in hardware.

Figure 7:
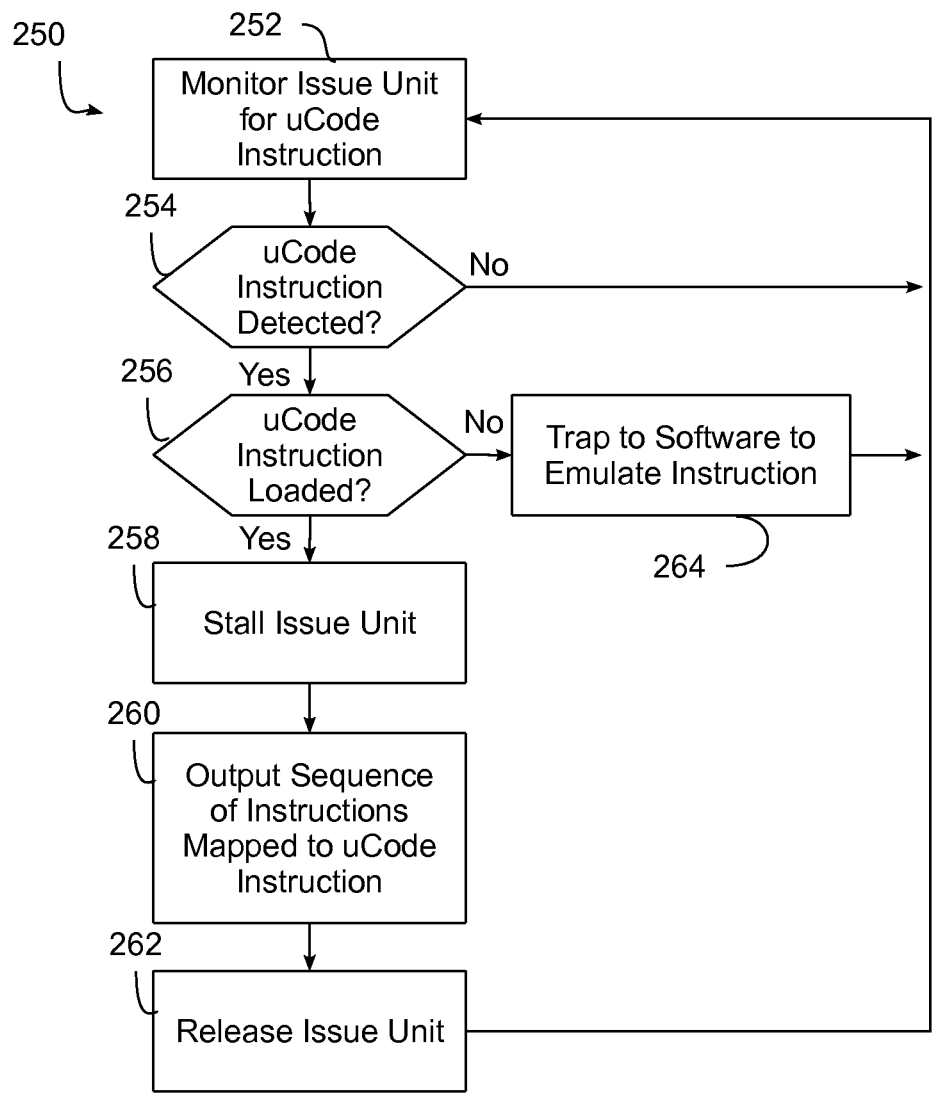
FIG. 7 is a flowchart illustrating an exemplary sequence of operations performed by the programmable microcode unit referenced in FIG. 5.

FIG. 7 illustrates a sequence of operations 250 implemented within the programmable microcode unit to handle microcode instructions in an instruction stream provided to a processing core implementing the programmable microcode unit. The programmable microcode unit monitors the instruction stream in the issue unit (block 252), and upon detection of a microcode instruction (block 254), determines whether an instruction sequence is loaded in the microcode unit, i.e., whether an instruction sequence has been mapped to the microcode instruction (block 256). If so, control passes to block 258 to stall the issue unit. Next, in block 260, the sequence of instructions mapped to the microcode instruction and stored in the rewriteable memory is output by the programmable microcode unit, and once all of the instructions in the sequence have been output, the issue unit is released (block 262), and the programmable microcode unit returns to monitoring the issue unit in block 252.

Returning to block 256, if the microcode instruction does not have a stored instruction sequence mapped thereto in the programmable microcode unit, control passes to block 264 to trap to software so that the microcode instruction can be emulated in software, as with conventional microcode units. Control then returns to block 252 to continue monitoring the issue unit. Finally, returning to block 254, if a monitored instruction is not a microcode instruction, control returns to block 252 to continuing monitoring the issue unit.

It will be appreciated that in some embodiments, the microcode unit may be multithreaded, and monitor the instruction stream for each thread in the issue unit. Furthermore, as noted above, separate rewriteable memories or partitions of a rewriteable memory may be used to map different instruction sequences to different threads. In other embodiments, the microcode unit may be single threaded.

Embodiments consistent with the invention provide a number of benefits over non-programmable microcode units. For example, the ability to program a microcode unit would enable a general purpose processing core to be customized for specific applications, and without the need for custom hardware designs, thereby reducing or eliminating the need to test and verify the processing core design for custom applications.

In addition, it may be desirable in some applications to configure a processing core to only support a subset of an instruction set, e.g., for cost or power consumption considerations, and to provide a programmable microcode unit that can be loaded with additional instructions from the instruction set based upon what instructions are needed for a particular application, such that first and second portions of an instruction set are implemented respectively by the fixed point execution unit of the processing core and the programmable microcode unit.

It may also be desirable to utilize a generic processing core that interfaces with various types of auxiliary execution units (AXU's), such as floating point units, encryption/decryption units, coprocessors, vector processing units, graphics processing units, XML processing units, etc., such that a programmable microcode unit can be loaded with microcode instructions suitable for whatever AXU is being used in a particular application, thereby eliminating the need for the generic processing core to support instructions for all possible AXU's that might be used with the processing core.

As another advantage, if it is discovered after manufacture that there is a bug in any of the instruction sequences supported by a particular microcode unit, the microcode unit may be reprogrammed with updated instruction sequences.

In some embodiments, a microcode unit may be reprogrammed for different sections of code to optimize execution of such sections of code. In addition, in some embodiments a microcode unit may be programmed to implement frequently executed functions, thereby shrinking application code and accelerating the performance of such frequently-executed functions.

In still other embodiments, different programs, processes or threads may use different microcode instructions, such that the microcode unit is reprogrammed in association with each context switch. Alternatively, multiple mappings may be stored in the microcode unit so that, upon a context switch, a different mapping is selected. As such, each program, process or thread may effectively be provided with a customized instruction set such that a single processing core can concurrently support multiple instruction sets for multiple concurrently executing programs, processes or threads.

Various modifications may be made to the disclosed embodiments without departing from the spirit and scope of the invention. Therefore, the invention lies in the claims hereinafter appended.

What is claimed is:

1. A circuit arrangement, comprising:
    a processing core including an issue unit and at least one execution unit, wherein the issue unit is configured to issue instructions from first and second instruction streams to the at least one execution unit for concurrent execution of the first and second instruction streams by the at least one execution unit, the first and second instruction streams respectively including a first and second instances of a microcode instruction, the second instruction stream associated with a different process, application, or thread from the first instruction stream; and
    a programmable microcode unit coupled to the issue unit, the programmable microcode unit configured to, in response to software executing on the processing core, map a first instruction sequence to the microcode instruction by storing the first instruction sequence in a first partition among a plurality of partitions defined in one or more rewriteable memories, and map a second instruction sequence to the microcode instruction by storing the second instruction sequence in a second partition among the plurality of partitions defined in the one or more rewriteable memories, wherein the programmable microcode unit is further configured to, in response detection of the first instance of the microcode instruction in the first instruction stream during the concurrent execution of the first and second instruction streams, issue the first instruction sequence to the at least one execution unit, and in response to detection of the second instance of the microcode instruction in the second instruction stream during the concurrent execution of the first and second instruction streams, issue the second instruction sequence to the at least one execution unit.

2. The circuit arrangement of claim 1, further comprising a software-writeable special purpose register coupled to the programmable microcode unit, the special purpose register configured to receive data associated with the first and second instruction sequences for storage in the one or more rewriteable memories.

3. The circuit arrangement of claim 2, wherein the special purpose register is a data special purpose register, and wherein the circuit arrangement further comprises a software-writeable address special purpose register configured to receive an address in the one or more rewriteable memories to which the data associated with the first and second instruction sequences is to be stored.

4. The circuit arrangement of claim 2, wherein the special purpose register is writeable only by protected mode code executing on the processing core, and wherein the processing core is configured to program the programmable microcode unit by storing an image of the one or more rewriteable memories in a shadow memory in response to user mode code executing on the processing core, and copy the image of the one or more rewriteable memories from the shadow memory to the one or more rewriteable memories in response to protected mode code executing on the processing core.

5. The circuit arrangement of claim 1, wherein the at least one execution unit includes a fixed point execution unit and an auxiliary execution unit, wherein the programmable microcode unit includes a plurality of instruction sequences mapped to a plurality of microcode instructions associated with an instruction set for the auxiliary execution unit.

6. The circuit arrangement of claim 1, wherein the programmable microcode unit is configured to detect the microcode instruction in the instruction stream and issue the first or second instruction sequence in response to detecting the microcode instruction.

7. An integrated circuit device including the circuit arrangement of claim 1.

8. A program product comprising a computer readable medium and logic definition program code stored on the computer readable medium and defining the circuit arrangement of claim 1.

9. A method of executing instructions in a processing core of the type including an issue unit and at least one execution unit, wherein the issue unit is configured to issue instructions from first and second instruction streams to the at least one execution unit for execution thereby, the first instruction stream including a first instance of a microcode instruction and the second instruction stream including a second instance of the microcode instruction, and the second instruction stream associated with a different process, application, or thread from the first instruction stream, the method comprising:

in response to software executing on the processing core, programming a programmable microcode unit coupled to the issue unit to map a first instruction sequence to a microcode instruction, including storing the first instruction sequence in a first partition among a plurality of partitions defined in one or more rewriteable memories;

in response to software executing on the processing core, programming the programmable microcode unit to map a second instruction sequence to the microcode instruction, including storing the second instruction sequence in a second partition among the plurality of partitions defined in the one or more rewriteable memories;

concurrently executing the first and second instruction streams;

in response detecting the first instance of the microcode instruction in the first instruction stream during the concurrent execution of the first and second instruction streams, issuing the first instruction sequence to the at least one execution unit with the programmable microcode unit. and in response to detecting the second instance of the microcode instruction in the second instruction stream during the concurrent execution of the first and second instruction streams, issuing the second instruction sequence to the at least one execution unit with the programmable microcode unit.

10. The method of claim 9, wherein programming the programmable microcode unit to map the first instruction sequence to the microcode instruction includes storing a plurality of instruction sequences mapped to a plurality of microcode instructions in the one or more rewriteable memories, and wherein issuing the first instruction sequence includes retrieving the first instruction sequence from the one or more rewriteable memories.

11. The method of claim 10, wherein the programmable microcode unit further includes a read only memory, the method further comprising initializing the programmable microcode unit by copying a plurality of default instruction sequences stored in the read only memory to the one or more rewriteable memories.

12. The method of claim 10, wherein programming the programmable microcode unit to map the first instruction sequence to the microcode instruction includes writing data associated with the first instruction sequence to a software-writeable special purpose register coupled to the programmable microcode unit.

13. The method of claim 12, wherein the special purpose register is a data special purpose register, and wherein the method further comprises writing to a software-writeable address special purpose register configured to receive an address in the one or more rewriteable memories to which the data associated with the first instruction sequence is to be stored.

14. The method of claim 12, wherein the special purpose register is writeable only by protected mode code executing on the processing core, and wherein programming the programmable microcode unit to map the first instruction sequence to the microcode instruction includes storing an image of the one or more rewriteable memories in a shadow memory in response to user mode code executing on the processing core, and copying the image of the one or more rewriteable memories from the shadow memory to the one or more rewriteable memories in response to protected mode code executing on the processing core.

15. The method of claim 9, wherein issuing the first instruction sequence to the at least one execution unit with the programmable microcode unit includes selecting from among the first instruction sequence and the second instruction sequence based upon a process, an application, or a thread associated with the first instance of the microcode instruction.

16. The method of claim 9, wherein the at least one execution unit includes a fixed point execution unit and an auxiliary execution unit, wherein the programmable microcode unit includes a plurality of instruction sequences mapped to a plurality of microcode instructions associated with an instruction set for the auxiliary execution unit.

17. The method of claim 9, wherein programming the programmable microcode unit to map the first instruction sequence to the microcode instruction includes updating a third instruction sequence to correct a bug in the third instruction sequence.

18. The method of claim 9, wherein the at least one execution unit implements a first portion of an instruction set, and wherein the programmable microcode unit implements a second portion of the instruction set.

19. The method of claim 9, wherein programming the programmable microcode unit to map the second instruction sequence to the microcode instruction is performed in response to a context switch, wherein issuing the first instruction sequence is performed prior to the context switch, and wherein issuing the second instruction sequence is performed after the context switch.

20. The method of claim 9, further comprising:
prior to a context switch, mapping the microcode instruction to the first instruction sequence, wherein issuing the first instruction sequence is performed prior to the context switch; and
in response to the context switch, selecting a different mapping such that the microcode instruction is mapped to the second instruction sequence, wherein issuing the second instruction sequence is performed after the context switch.

* * * * *